United States Patent
Marchesiello et al.

(10) Patent No.: US 11,148,554 B2
(45) Date of Patent: Oct. 19, 2021

(54) HANGER FOR A SUSPENDED CONTACT WIRE OF A RAILWAY LINE AND A POWER LINE COMPRISING SAID HANGER

(71) Applicant: OFFICINA FRATELLI BERTOLOTTI S.P.A., Volpiano (IT)

(72) Inventors: Stefano Marchesiello, Turin (IT); Luigi Garibaldi, Turin (IT); Dario Anastasio, San Gregorio di Catania (IT); Alessandro Fasana, Salassa (IT)

(73) Assignee: OFFICINA FRATELLI BERTOLOTTI S.P.A., Volpiano (IT)

( * ) Notice: Subject to any disclaimer, the term of this patent is extended or adjusted under 35 U.S.C. 154(b) by 468 days.

(21) Appl. No.: 16/319,655

(22) PCT Filed: Jul. 24, 2017

(86) PCT No.: PCT/IB2017/054474
§ 371 (c)(1),
(2) Date: Jan. 22, 2019

(87) PCT Pub. No.: WO2018/020397
PCT Pub. Date: Feb. 1, 2018

(65) Prior Publication Data
US 2021/0284045 A1    Sep. 16, 2021

(30) Foreign Application Priority Data
Jul. 25, 2016    (IT) .......................... 102016000077791

(51) Int. Cl.
*B60M 1/234*    (2006.01)
(52) U.S. Cl.
CPC .................................. *B60M 1/234* (2013.01)
(58) Field of Classification Search
CPC ........... B60M 1/234; B60M 1/20; B60M 1/26
(Continued)

(56) References Cited

U.S. PATENT DOCUMENTS

| 421,677 A | * | 2/1890 | Cunningham | ........... H02G 7/20 |
| | | | | 174/43 |
| 546,407 A | * | 9/1895 | Pfouts | .................... B60M 1/234 |
| | | | | 191/42 |

(Continued)

FOREIGN PATENT DOCUMENTS

| CN | 103904603 A | 7/2014 |
| EP | 0581987 A1 | 2/1994 |

(Continued)

OTHER PUBLICATIONS

International Search Report and Written Opinion issued in PCT/IB2017/054474, dated Nov. 17, 2017; ISA/EP.

(Continued)

*Primary Examiner* — Zachary L Kuhfuss
(74) *Attorney, Agent, or Firm* — Harness, Dickey & Pierce, P.L.C.

(57) ABSTRACT

A hanger for an overhead railway line adapted to be fixed between a carrying cable or a bracket and a power supply contact wire comprises:
 a clamp to tighten an undercut portion of the contact wire, and a negative-stiffness elastic device connected to the clamp, the elastic device comprising:
  a. a pre-compressed elastic assembly along a first direction and having a movable point to shift in a second direction transverse to the first direction so as to decrease the pre-compression following a load disturbance;
  b. an elastic element connected to the pre-compressed elastic assembly to apply, in the second direction, an action onto the movable point when the clamp is moved upon the passage of a pantograph on the contact wire;
  c. a spacer to connect the clamp to the elastic element under traction/compression;

(Continued)

d. a calibrated friction action being generated upon the movement of the movable point.

10 Claims, 4 Drawing Sheets

(58) Field of Classification Search
USPC .................................................... 191/40, 41
See application file for complete search history.

(56) References Cited

U.S. PATENT DOCUMENTS

| | | |
|---|---|---|
| 918,317 A | 4/1909 | Harvey |
| 1,132,734 A * | 3/1915 | Schaake .................. B60M 1/23 |
| | | 191/41 |
| 1,138,773 A * | 5/1915 | Mead ....................... B60M 1/23 |
| | | 191/41 |
| 3,044,763 A | 7/1962 | Jorzenink |

FOREIGN PATENT DOCUMENTS

| | | |
|---|---|---|
| GB | 438492 A | 11/1935 |
| GB | 918317 A | 2/1963 |
| JP | 2012116418 A | 6/2012 |

OTHER PUBLICATIONS

Office Action issued in corresponding Japanese Patent Application No. 2019-504808 dated Jul. 27, 2021 (4 pages).

* cited by examiner

HANGER FOR A SUSPENDED CONTACT WIRE OF A RAILWAY LINE AND A POWER LINE COMPRISING SAID HANGER

CROSS-REFERENCE TO RELATED APPLICATIONS

This application is a U.S. National Phase Application under 35 U.S.C. 371 of International Application No. PCT/162017/054474 filed on Jul. 24, 2017, which claims the benefit of Italian Patent Application No. 102016000077791 filed on Jul. 25, 2016. The entire disclosures of the above-identified applications are incorporated herein by reference.

TECHNICAL FIELD

The present invention relates to a hanger for a suspended contact wire of a railway overhead power supply line and a railway overhead power supply line comprising said hanger.

PRIOR ART

A hanger holds a power supply contact wire of a railway overhead power supply line in suspension. The hanger hangs from a carrying cable along a span between two successive poles or portals of the railway power supply line or, at the pole, directly from a bracket fixed to the pole or portal.

The stretched contact wire is a linear electrical conductor on which the pantograph of a train carriage rests for supplying an electric assembly for the traction of the train, and possibly other devices on board the train.

The contact wire has a predetermined cross-section which, when the cable is in operation, has a bottom convex profile in contact with the pantograph and a top shaped profile with undercuts, e.g. swallowtailed, for a connection clamp of the hanger.

The connection clamp of the hanger is preferably made of a copper alloy, still more preferably of an alloy also comprising nickel and silicon, and is fixed to the top profile of the contact wire by form-fitting connection so as not to interfere with the passage of the pantograph.

A need is felt to minimise and possibly prevent separation between the pantograph and the suspended contact wire while the train is moving. In particular, one of the causes of separation is the movement of the contact wire with respect to the ground. This movement is due to both natural causes, such as the wind, and oscillations that propagate along the contact wire when the train passes by. In addition, the contact wire, although taut by counterweights, still has an arrow between two adjacent hangers due to its own weight.

In particular, the pantograph is configured to apply a contact pressure to the contact wire, and said contact pressure, in particular on high-speed trains, causes an upward movement of the contact wire and, more generally, a stress of a certain magnitude. In greater detail, this movement is localized and has its maximum in the contact area between the pantograph and the contact wire.

OBJECT OF THE INVENTION

The object of the present invention is to reduce and possibly prevent separation between the pantograph and the power supply contact wire, with particular reference to high-speed trains, i.e. those having a cruising speed greater than 200 km/h.

The object of the present invention is achieved by means of a hanger according to claim 1.

BRIEF DESCRIPTION OF THE DRAWINGS

The present invention will now be described with reference to the accompanying drawings, which illustrate some non-limiting embodiments thereof, in which.

PREFERRED EMBODIMENT OF THE INVENTION

Figure 1:
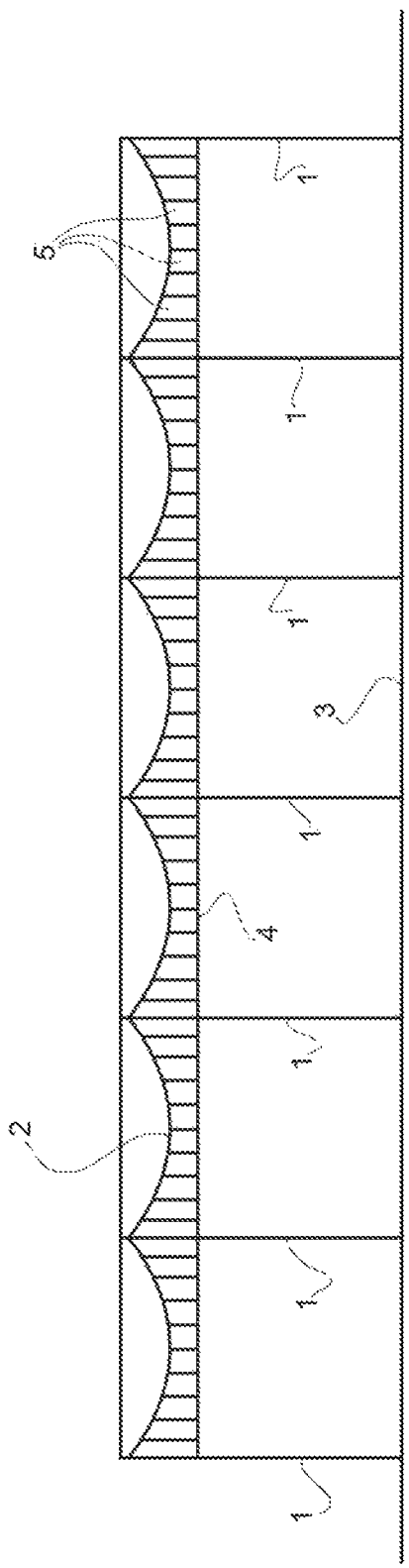
FIG. 1 is a schematic view of a railway line.

FIG. 1 qualitatively shows a train's overhead power supply line. The overhead line comprises a plurality of poles or portals 1, a carrying cable 2 fixed to brackets carried by the poles 1 to be suspended on tracks 3, and a contact wire 4 connected to the carrying cable 2 through a plurality of hangers 5 so as to be in contact with a pantograph of an electric traction train.

The overhead line further comprises counterweights (not shown) for stretching both the carrying cable 2 and the contact wire 4 so as to reduce the static arrow of the contact wire 4 between two adjacent hangers 5. This static arrow is due to the weight of the contact wire 4 itself.

Figure 2:
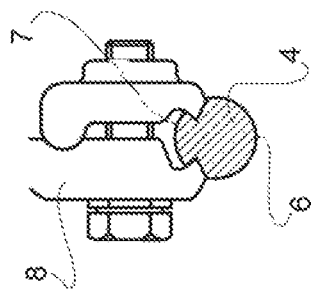
FIG. 2 is a detail of a clamp of a hanger according to the present invention.

The contact wire 4 is obtained by extrusion and has a cross section defined by national regulations. These regulations provide that the cross section has a bottom convex profile 6 oriented, in use, towards the tracks 3 and a top undercut profile 7 oriented towards the hangers 5 and the carrying cable 2. In order to firmly fix in the vertical direction the contact wire 4 to the carrying cable 2, each hanger 5 comprises a clamp 8 which, after being tightened by means of a bolt or other equivalent closure, is connected by form-fitting connection with the contact wire 4 since it tightens the top profile 7. For example, according to Italian regulations, the cross section of the contact wire 4 defines, at the top profile 7, a first and a second 78°-amplitude, V-shaped, swallowtailed undercut (FIG. 2).

According to the present invention, a hanger 5 is modified to include a negative-stiffness elastic device 10 for storing oscillatory energy.

The elastic device 10 comprises a pre-compressed elastic assembly 11 along a direction A substantially parallel, in use, to the contact wire 4, and configured to have a movable point 12 that moves in a transverse direction B, in particular perpendicular to direction A, so as to decrease, in certain conditions, the pre-compression of the pre-compressed elastic assembly 11. In particular, the elastic assembly 11, if considered separately from the hanger 5, is pre-compressed and kept in a neutral condition of buckling elastic instability which, if disturbed, results in the release of elastic potential energy following a shift of the movable point 12.

In addition, the elastic device 10 comprises an elastic element 13 connected to the pre-compressed elastic assembly to apply an action onto the movable point 12 along direction B and stably define the neutral position.

The elastic element 13 is connected to the clamp 8 by means of a spacer 14 to transmit both traction and compression between the elastic element 13 and the clamp 8.

When the elastic assembly 11 releases part of the compression preload through movement along the direction B of the movable point 12, the negative-stiffness elastic device 10 generates a friction action, preferably a dry friction or a hysteretic internal friction of the deformable elastic material used for the manufacture of the elastic assembly 11 and/or the elastic element 13. When the friction is a dry friction, it is possible to exploit the sliding friction.

This relatively low friction is combined with the storage of elastic potential energy in the pre-compressed elastic assembly 11 to provide an overall high dissipating action on the wave-like phenomena of the contact wire 4, in particular the wave-like phenomena triggered by the passage of the pantograph. The friction generated by the movement of the elastic assembly 11 and/or the elastic element 13 can therefore be relatively low and is calibrated to be combined with the action resulting from the storage of elastic energy in the pre-compressed elastic assembly 11.

According to a preferred embodiment of the present invention, the pre-compressed elastic assembly 11 comprises an articulated mechanism 15 having a first and a second arm or strut 16, 17 mutually hinged at the movable point 12. Movement along the direction B of the movable point 12 is obtained by means of guides 18, 19 slidably coupled to the articulated mechanism 15. According to an embodiment, the friction action is generated during interaction between the guides 18, 19 and the articulated mechanism 15. In addition, the position and/or configuration of the guides 18, 19 defines the direction A.

Preferably, the elastic element 13 is hinged at the movable point 12 so as to be able to self-align as a result of the action of the contact wire 4 and of the related tension counterweights.

Preferably, moreover, the pre-compressed elastic assembly 11 and/or the elastic element 13 comprise coil springs.

Figure 3:
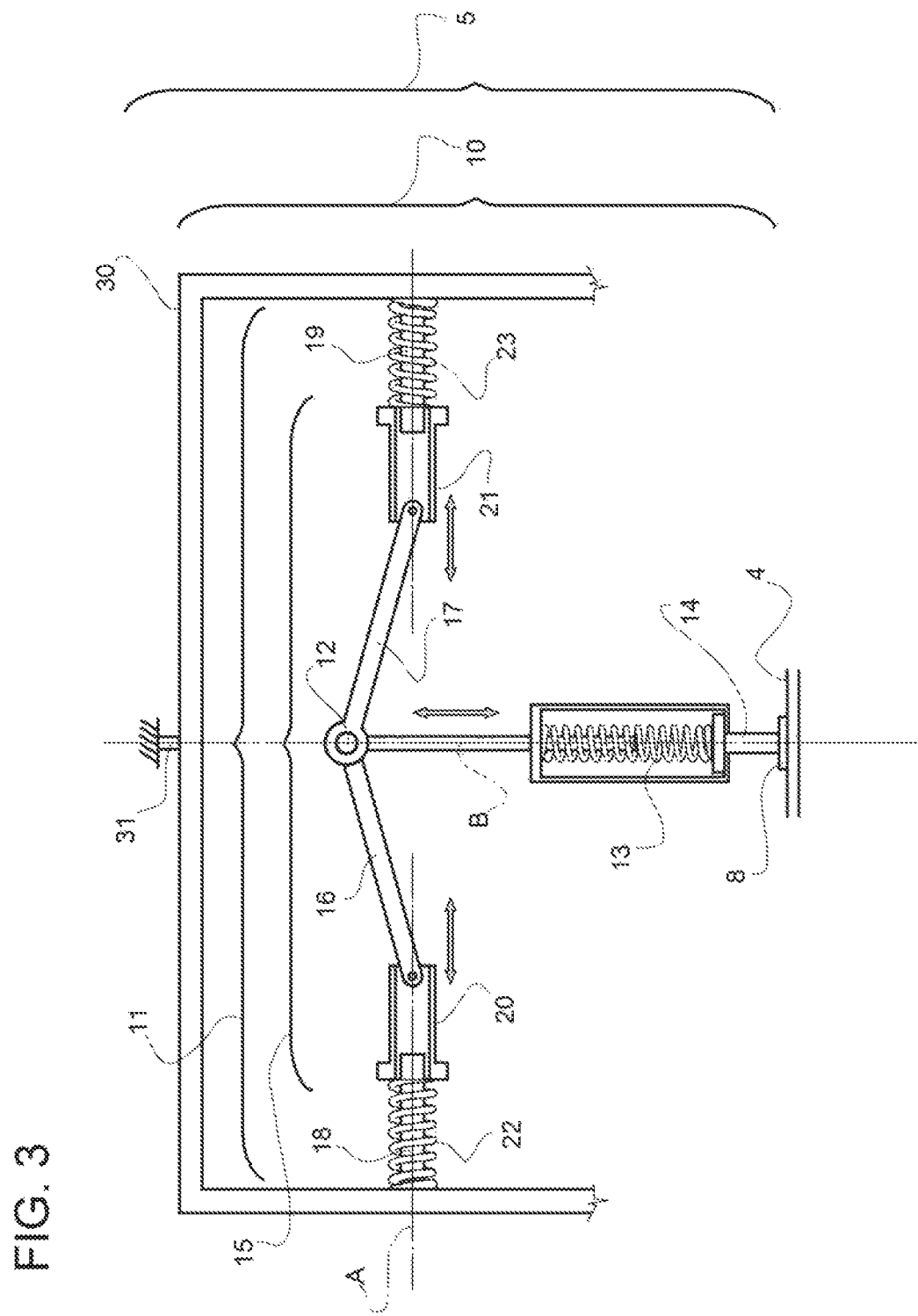
FIG. 3 is a diagram of a first embodiment of a hanger according to the present invention.

In the embodiment according to FIG. 3, the articulated mechanism 15 further comprises a first and a second slider 20, 21 hinged to the first and the second arm 16, 17, respectively, to cooperate with the guides 18, 19 along direction A. Furthermore, the pre-compressed elastic assembly 11 comprises a first and a second coil spring 22, 23 compressed and released by the sliders 20, 21 and arranged opposite to one another, parallel to direction A, in order to obtain pre-compression.

Preferably, the sliders 20, 21 progressively disengage from the guides 18, 19 so as to generate, during the movement of the movable point 12, a variable friction progressively decreasing with the decrease of the pre-compression of the pre-compressed elastic assembly 11.

According to the particular embodiment shown in FIG. 3, the sliders 20, 21 are sleeves and the guides 18, 19 are fixed bars engaged in the sleeves 20, 21. Furthermore, the springs 22, 23 surround the bars 18, 19 and are guided by the latter to remain parallel, in particular coaxial, to/with direction A. Direction A coincides with the axes of the bars 18, 19 and of the bushes 20, 21. According to this embodiment, the springs 22, 23 are fixed with respect to direction A during the movement of the movable point 12. This decreases the movable masses and consequently any negative inertial contributions.

Figure 4:
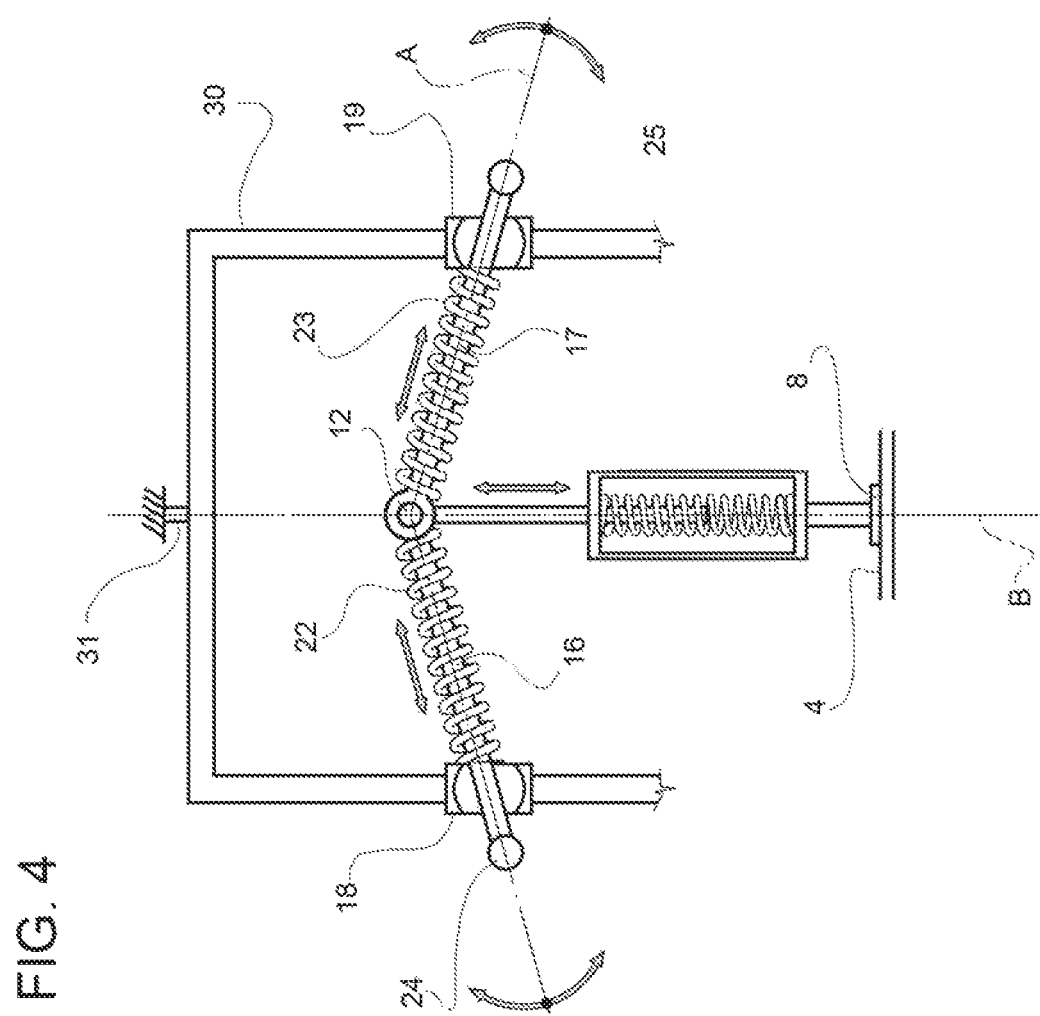
FIG. 4 is a diagram of a second embodiment of a hanger according to the present invention.

According to the alternative embodiment of FIG. 4, the arms 16, 17 are engaged to generate constant friction in the guides 18, 19 independently of the position of the movable point 12.

In particular, the guides 18, 19 are angularly adjustable bushes engaged with the arms 16 and 17, respectively, and allow angular movement of the latter when the movable point 12 moves along direction B.

Furthermore, the springs 22, 23 are preferably carried by the respective arms 16, 17 and, in order to compress, abut respectively against the adjustable bushes 18, 19.

Advantageously, on the opposite side of the movable point 12 with respect to the related adjustable bush 18, 19, each arm has a counterweight 24, 25 so that each arm 16, 17, with its spring 22, 23, remains in a vertical balance with respect to the corresponding bush 18, 19 when the movable point 12 is located along direction A.

In addition, the counterweights 24, 25 have such a size as to prevent the arms 16, 17 from slipping off the adjustable bushes 18, 19.

In the embodiment of FIG. 4, the line joining the rotation centres of the bushes 18, 19 defines the direction A.

In both embodiments, the guides 18, 19 are carried by a rigid frame or casing 30 hanging either from the bracket of the pole/portal 1 or from the carrying cable 2 between two adjacent poles/portals.

The rigid frame 30 is preferably open, thus allowing the visual inspection of the components of the negative-stiffness elastic device 10.

The connection between the rigid frame and the bracket or the carrying cable 2 must allow transmission of traction/compression in the vertical direction.

Advantageously, the movable point 12, the clamp 8 and a connection 31 of the hanger 5 opposite to the clamp 8 along direction B are aligned. The connection 31 is fixed to the bracket and/or the carrying cable 2.

In use, the hanger 5 according to the present invention is mounted so that, under static conditions, the movable point 12 is substantially aligned along direction A in a condition in which the compression of the elastic assembly 11 is maximum with reference to the other conditions of use.

When the pantograph of a train passes by, the elastic element 13 transmits to the movable point 12 a disturbance along direction B that is large enough to disturb the position of the movable point 12, causing a consequent release of elastic energy from the pre-compressed elastic assembly 11. Preferably, this disturbance is such as to allow the release of the elastic energy and, at the same time, movement towards the carrying cable 2 of the movable point 12. By doing so, the energy introduced in the negative-stiffness device 10 by the arrival of the pantograph is at least partially compensated by the elastic potential energy released by the release of the preload of the pre-compressed elastic assembly 11. In addition, the elastic energy stored in the pre-compressed elastic assembly 11 and in the elastic element 13 when the clamp 8 brings the movable point 12 back to the neutral position is subtracted to further wave-like phenomena of the contact wire 4. In this way, the conditions of contact with the pantograph improve even when it is a high-speed train to pass by.

In particular, after the passage of the pantograph, the contact wire 4, as a result of the tension obtained by means of the counterweights along the overhead power supply line, brings the movable point 12 back to the neutral position through the action of the elastic element 13.

Figure 5:
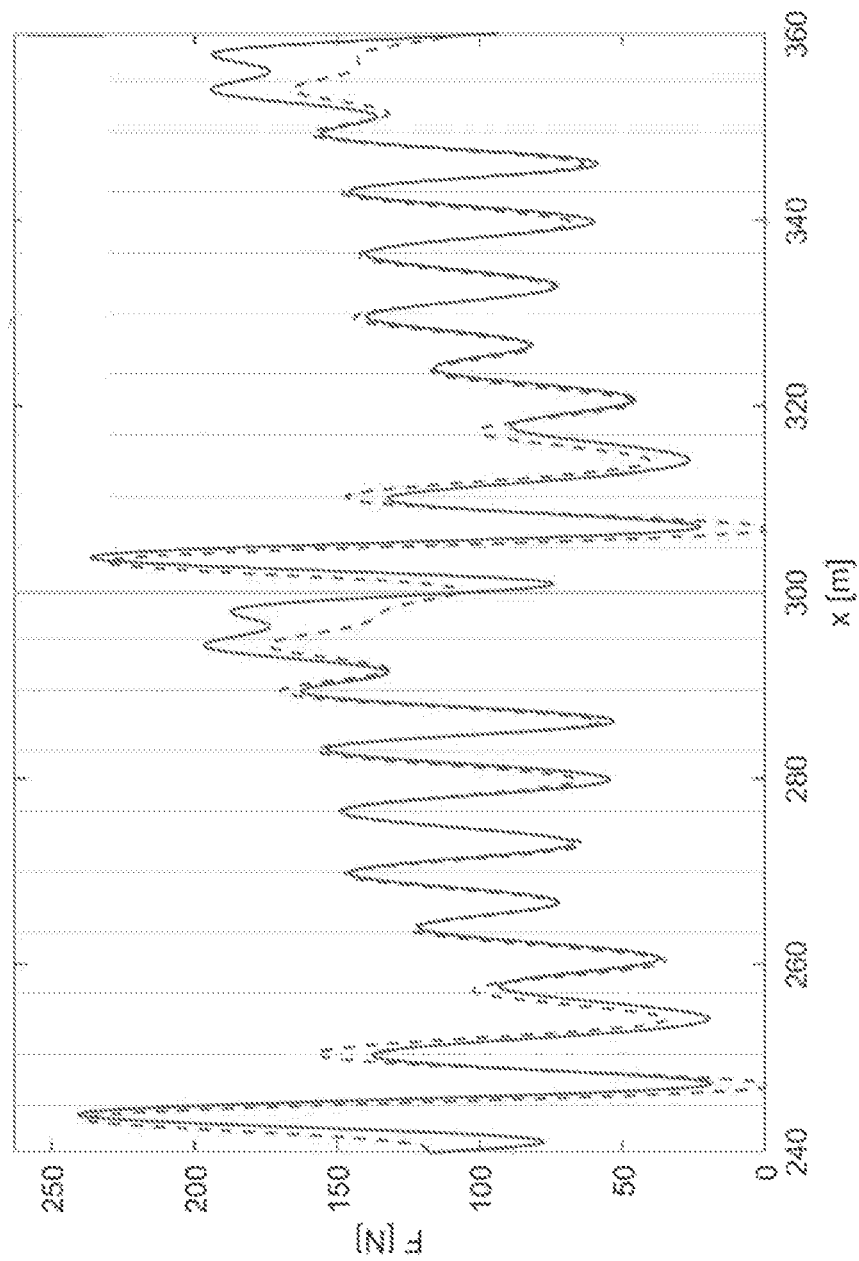
FIG. 5 is a graph of the contact forces between the contact wire and the pantograph following a numerical simulation.

FIG. 5 illustrates the results of a comparative simulation using a finite element model for the carrying cable 2, the hangers 5, and the contact wires 4, and a concentrated parameter model for the pantograph. The simulated speed of the pantograph is 350 km/h.

The rigidity of each spring 22, 23 is 15 N/mm and the rigidity of the elastic element 13 is 12 N/mm, with reference to the diagram of FIG. 3.

In particular, FIG. 5 shows that in no case the contact force between the pantograph and the contact wire 4 is null when the hanger 5 according to the present invention is used (solid line). This ensures no separation compared to when the hanger 5 according to the present invention is not used (dashed line).

Preferred materials for manufacturing the clamp 8 are copper and alloys thereof or steel and alloys thereof, particularly stainless steel and alloys thereof.

The invention claimed is:

1. A hanger for an overhead railway line adapted to be fixed between a carrying cable or a bracket and a power supply contact wire, comprising:
   a clamp to tighten an undercut portion of the contact wire, and a negative-stiffness elastic device connected to the clamp, the elastic device comprising:
   a. a pre-compressed elastic assembly along a first direction and having a movable point to shift in a second direction transverse to the first direction so as to decrease the pre-compression following a load disturbance;
   b. an elastic element connected to the pre-compressed elastic assembly to apply, in the second direction, an action onto the movable point when the clamp is moved upon the passage of a pantograph on the contact wire;
   c. a spacer to connect the clamp to the elastic element under traction/compression;
   d. a calibrated friction action being generated upon the movement of the movable point;
   the negative-stiffness elastic device being configured so that the movable point has a neutral position when the hanger is fixed to the overhead line and the contact wire is still, and so that the clamp, acting on the elastic element by means of the spacer, brings the movable point back to the neutral position due to the longitudinal tension of the contact wire after the passage of the pantograph, the movable point moving along the second direction to release elastic energy of the elastic assembly when the passage of the pantograph occurs.

2. The hanger according to claim 1, wherein the calibrated friction action is defined by dry friction and/or hysteretic internal friction of a deformable elastic material of the elastic assembly and/or of the elastic element.

3. The hanger according to claim 2, wherein the negative-stiffness elastic device comprises an articulated mechanism having a first and a second strut hinged at the movable point and sliding along respective guides when the movable point shifts along the second direction.

4. The hanger according to claim 3, wherein the dry friction is oblique due to the translational movement of the struts with respect to the guides.

5. The hanger according to claim 3, wherein the articulated mechanism comprises sliders progressively disengaging from the respective guides to define a friction action decreasing with the decrease in the pre-compression of the elastic assembly when the movable point shifts.

6. The hanger according to claim 5, wherein the guides are fixed with respect to the articulated mechanism and in that the pre-compressed elastic assembly comprises opposing springs supported by the guides and compressed by means of the sliders.

7. The hanger according to claim 3, wherein the guides are adjustable bushes engaging in a respective strut.

8. The hanger according to claim 7, wherein the pre-compressed elastic assembly comprises opposing springs supported by struts and compressed by means of adjustable bushes and in that, from the opposite end of the springs with respect to the guides, each strut comprises a counterweight.

9. The hanger according to claim 1, wherein the hanger comprises a frame or casing supporting the negative-stiffness elastic device and is opened to visually inspect the negative-stiffness elastic device and the elastic element.

10. The hanger according to claim 1, wherein the hanger comprises a connection portion to connect the hanger to the bracket or to the carrying cable and in that the connection portion, the movable point and the clamp are aligned.

* * * * *